Patented Oct. 6, 1953

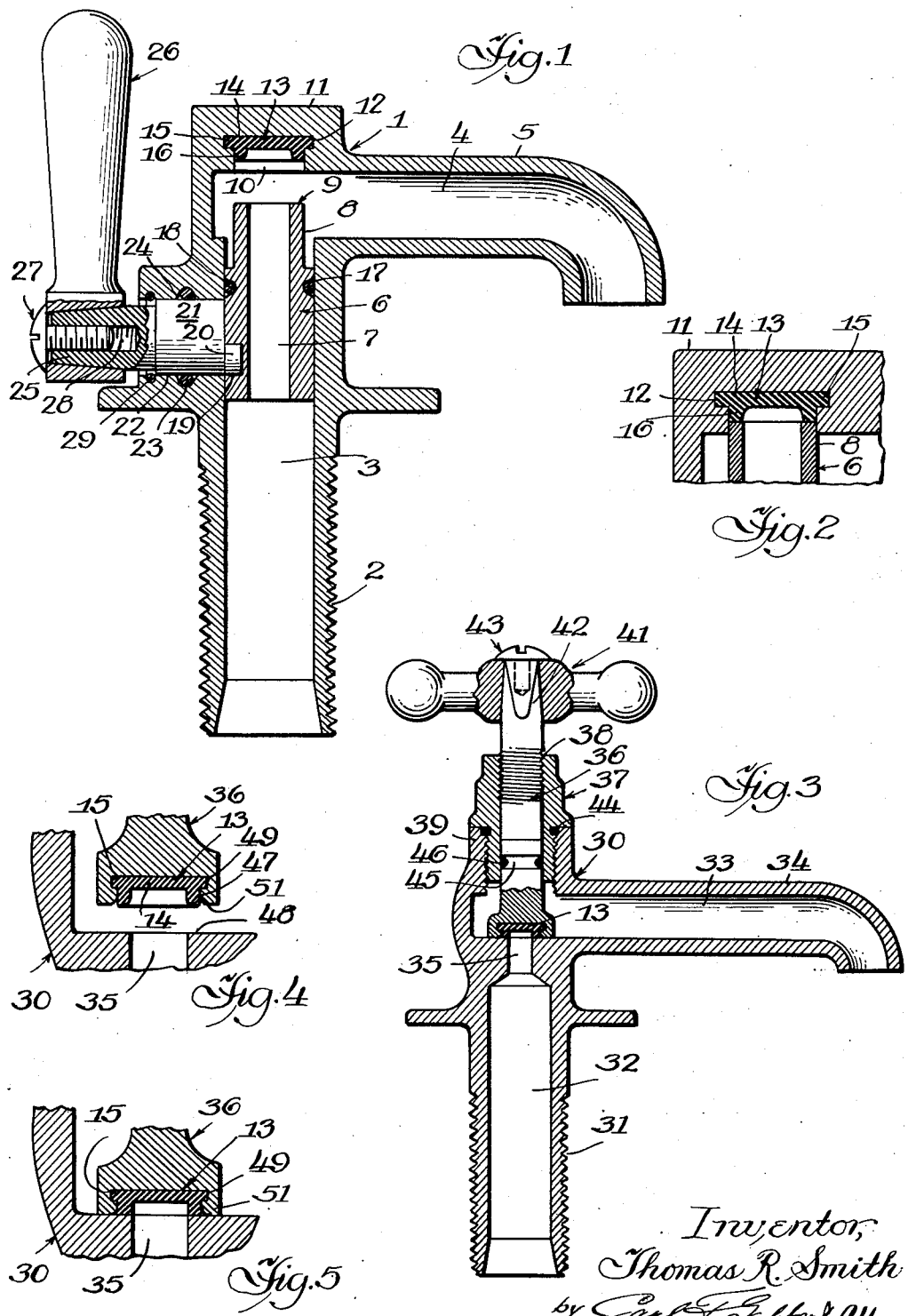

2,654,560

UNITED STATES PATENT OFFICE 2,654,560

VALVE WITH SELF-ANCHORING SEAL

Thomas R. Smith, Newton, Iowa, assignor to The Maytag Company, Newton, Iowa, a corporation of Delaware Application March 8, 1949, Serial No. 80,129

3 Claims. (Cl. 251—27)

The present invention relates to a seal construction and especially to a novel seal and seal assembly in which the seal is so designed and constructed as to be self-anchoring and retained in operative position without the aid of any other securing means such as screws, washers, rivets, etc.

Among the objects of the present invention is the provision of a novel seal construction provided with a radial and outwardly projecting shoulder or flange adapted to be conformably received and retained in a complementary recess or channel in the supporting member for the seal. The present construction and manner of assembly requires no other securing means for retaining the seal in its operative position.

The present invention further comprehends a novel seal having an imperforate base and an interlocking annular shoulder or outwardly projecting radial flange for anchoring and retaining the seal in operative position in the member in or by which it is supported or carried.

Further objects, advantages and capabilities will later more fully appear or are inherently possessed by my novel seal construction.

This application is a continuation in part of my copending application Serial No. 658,696, filed April 1, 1946, now Patent No. 2,568,520, issued September 18, 1951.

In the drawing:

Fig. 1 is a view in vertical cross-section through one form of faucet employing the novel seal and showing the position and arrangement of the valve assembly when the valve is moved to open position.

Fig. 2 is a fragmentary enlarged view in vertical cross-section through the faucet or valve body and the novel seal and showing their relation when the valve is moved to closed position.

Fig. 3 is a view in vertical cross-section through another form of faucet with the novel seal mounted in a recess or opening in the end of the valve stem and the valve being shown in closed position.

Fig. 4 is a fragmentary enlarged view in vertical cross-section through the faucet body and valve assembly of Fig. 3, but showing the valve in open position.

Fig. 5 is a view similar to Fig. 4, but showing the valve in closed position.

Referring more particularly to the disclosure in the drawing and to the illustrative embodiments therein shown, the novel seal is shown assembled or embodied in two forms of faucets, in one of which the seal is assembled and retained in the body of the faucet and in the other the seal is assembled and carried in the movable valve stem.

In the faucet construction shown in Figs. 1 and 2, the assembly comprises a faucet body 1 having a threaded connection or shank 2 for removably mounting the faucet upon any suitable support and connecting it with an inlet pipe (not shown) through which water or other fluid is supplied to the faucet. This threaded connection and the faucet body are formed with a bore providing an inlet opening 3 therethrough and communicating with an outlet opening 4 in a discharge spout or nozzle 5.

In the inlet opening 3 is slidably mounted a valve plunger 6 having a passage 7 therethrough communicating with the inlet opening 3 and adapted to communicate with the outlet opening 4 when the valve plunger is in its lowered, open position as in Fig. 1. The upper portion of the valve plunger is reduced at 8 and the upper open end 9 thereof is adapted to enter a downwardly opening recess 10 provided in the upper portion or head 11 of the faucet body to restrict or cut off the flow of liquid through the passage 7. This recess 10 is undercut or channelled at 12 whereby to conformably receive a novel seal or sealing element 13 provided with an imperforate base 14, a radially outwardly projecting shoulder or flange 15 conforming to the undercut or channel 12 provided at the base of the recess 10, and an annular depending sealing face or lip 16 whose outer wall is preferably contiguous with and supported by the side wall of the recess.

The novel seal or sealing element 13 is formed or molded of a suitable resilient material such as natural or compounded synthetic rubber that is impervious to the water or fluid flowing through the faucet, and with its depending sealing lip 16 adapted to be engaged by the upper end 9 of the plunger as it is moved or projected upwardly into the recess 10. This upper end 9 of the plunger 6 forms a valve seat for seating and sealing contact with the sealing lip of the present seal.

To prevent leakage between the valve plunger and adjacent interior of the faucet body by the fluid under pressure, the valve plunger is provided with a substantially V-shaped groove or recess 17 in which is positioned a resilient sealing ring 18 of greater external diameter than the internal diameter of the bore or adjacent surface of the faucet body whereby the sealing or contacting face of the sealing ring is in continuous wiping and sealing contact with the interior of the faucet body.

Manually controlled means are provided to move the valve plunger 6 in the faucet body to closed or open position and to thereby effectively control the flow of fluid therethrough. To raise the valve plunger to closed position in which the upper or seating end 9 enters the open end of the recess 10 and engages the sealing lip or lower face 16 of the novel seal 13, or to lower the valve plunger to successively disengage the valve seat 9 from the sealing lip or face 16, withdraw the upper end of the plunger from the recess 10 and open the valve for the passage of water or other fluid under pressure, the plunger is provided adjacent its lower end with an elongated and transversely disposed slot 19 adapted to conformably receive an eccentric pin 20 on the end of a shaft or stem 21.

The shaft or stem 21 is rotatably mounted or journalled in a bore or opening 22 in the faucet body and sealed against leakage by means of a resilient sealing ring 23 pivotally or shiftably positioned in a substantially V-shaped groove or recess 24 provided in the body of the faucet. At its outer end 25 the shaft or stem 21 is tapered to receive a handle 26 which is retained thereon by means of a screw or bolt 27 received in a threaded recess 28 in the outwardly tapered end 25 of the shaft or stem, and the latter and its eccentric pin 20 are retained in operative position by a snap ring 29 removably mounted in an annular recess in the bore or opening 22. It is to be noted that when the eccentric pin 20 is in its upper position to seal the passage, it provides a stop to limit the longitudinal compression on the sealing lip 16.

In Figs. 3, 4 and 5, my novel self-anchoring seal or sealing element 13 is shown employed in a faucet of the type provided with a threaded and longitudinally movable valve stem in the lower end of which is mounted the seal. In this construction there is provided a valve body 30 having a threaded connector or shank 31 formed with an inlet opening 32 communicating with an outlet opening 33 in a spout or nozzle 34 through a reduced passage 35 disposed at the upper end of the inlet 32. In the body of the faucet is the valve stem 36 longitudinally movable and adjustable in a cap or packing nut 37 through a threaded connection at 38, the cap in turn being detachably mounted or threaded into the upper end 39 of the faucet body 30. A handle 41 is shown detachably mounted on the upper and outer tapered end 42 of the valve stem and held in place by a screw or bolt 43. A gasket seal or washer 44 is preferably provided to seal the packing nut against leakage while to effectively seal and prevent leakage along the valve stem 36 this stem is provided with a substantially V-shaped recess or groove 45 in which is disposed a resilient sealing ring 46.

The valve stem 36 is disclosed as provided with a recess 47 at its lower end opening downwardly toward the valve seat 48 provided in the faucet body and encompassing the passage 35. At or adjacent its base this recess is undercut or channelled at 49 to conformably receive the radially outwardly projecting shoulder or flange 15 and which shoulder or flange provides the sole anchoring means for retaining the seal in its operative position. The depending annular end 51 of the valve stem provides a stop which contacts the faucet body about the valve seat 48 after the sealing face or lip 16 contacts the valve seat, and this metal-to-metal contact effectively limits the amount of squeeze or endwise compression to which the seal may be subjected in use.

The seal 13 as well as the sealing rings employed for sealing against leakage about the plunger or valve stem, are all formed of a resilient material such as natural or compounded synthetic rubber that may be readily deformed but quickly returns or tends to return to its original shape. Such material has a relatively long life and is highly resistant to wear and to chemical and other influences to which it may be subjected in use.

From the above description it will be apparent that the present invention comprehends a novel valve seal formed of a resilient material and provided with an imperforate base, an annular depending sealing lip, and a radial or outwardly projecting shoulder or peripheral flange which when forced into a complementary recess in a valve assembly, securely anchors the seal in operative position. Although this flange or shoulder and the liquid or fluid under pressure is relied upon for anchoring and retaining the seal in position, such seal will be maintained in operative position under all conditions to which it may be subjected in use, even under a relatively high vacuum. By forming the seal in the manner disclosed with its imperforate base and flange fitting snugly in the recess and undercut or channel, no water or other fluid under pressure can find access in and about the rear surface of the seal. Due to the resiliency of the material from which this seal is constructed, it is a simple matter to assemble, disassemble or replace a seal which snaps into position when forced into its recess.

Having thus disclosed the invention, I claim:

1. In a sealing construction for a faucet body provided with a fluid passage, a valve seat encompassing the passage and a valve member movable in the body, said valve member provided with a recess provided in the lower end opening toward the passage and valve seat and having a circumferential side wall and a channel at the base of the recess and of greater diameter providing an annular offset, and a preformed resilient sealing element mounted in the recess and comprising a flat, imperforate base against which the fluid pressure acts, a depending annular sealing lip projecting outwardly from the base in contact with the circumferential side wall of the recess and adapted to engage and seal against the valve seat to close the passage, and a radially outwardly projecting flange conformably received in the annular offset to thereby anchor and retain the seal in position, and means for limiting the axial compression on the sealing lip.

2. In a valve seal construction for a valve body provided with a passage therethrough, a valve seat encompassing the discharge end of this passage and a plunger relatively movable with respect to the seat, an undercut recess in the lower portion of said plunger opening toward the passage and seat, and a preformed, resilient self-sealing element mounted in the recess and having an imperforate base and a circumferential annular shoulder disposed in the bottom of the recess with the shoulder closely fitting and conforming to the undercut, an annular depending sealing lip disposed inwardly from the outer circumference of the shoulder and projecting toward the valve seat and slightly beyond the lower portion of the plunger, the outer circumference of the sealing lip being encompassed and supported by the side wall of the recess, and means for limiting the compression to which the sealing lip may be subjected in use.

3. In a sealing construction for a member provided with a passage therethrough and a valve seat encompassing the passage, a member relatively movable with respect to the valve seat and having a recess therein opening toward the passage, said recess having an annular undercut at the bottom thereof to provide an outer radial shoulder, and a resilient sealing element carried within the recess and preformed to provide an imperforate base portion conforming to the bottom of said recess, a radially outwardly extending annular shoulder integral with said imperforate base snugly received and anchored within the annular undercut of the recess to provide the sole retaining means for said sealing element, and an integral annular sealing lip confined by the encompassing wall of the recess and extending outwardly beyond said undercut shoulder for engaging said valve seat.

THOMAS R. SMITH.

References Cited in the file of this patent

UNITED STATES PATENTS

| Number | Name | Date |
|---|---|---|
| 486,839 | McNeil | Nov. 22, 1892 |
| 1,321,673 | Sayward | Nov. 11, 1919 |
| 1,586,347 | Wilson | May 25, 1926 |
| 1,662,291 | Bastian | Sept. 7, 1926 |
| 1,695,536 | Crowley | Dec. 18, 1928 |
| 1,913,381 | Grass | June 13, 1933 |
| 2,318,236 | Layton | May 4, 1943 |
| 2,397,269 | Kelly | Mar. 26, 1946 |
| 2,403,028 | Smith | July 2, 1946 |
| 2,403,029 | Smith | July 2, 1946 |
| 2,408,006 | Smith | Sept. 24, 1946 |
| 2,414,908 | Smith | Jan. 28, 1947 |

FOREIGN PATENTS

| Number | Country | Date |
|---|---|---|
| 184,911 | Great Britain | of 1922 |